United States Patent
Choi et al.

(10) Patent No.: US 12,335,631 B2
(45) Date of Patent: Jun. 17, 2025

(54) ADAPTIVE OPTICAL SYSTEM USING ARTIFICIAL INTELLIGENCE AND NOT HAVING DEFORMABLE MIRROR

(71) Applicant: KOREA ASTRONOMY AND SPACE SCIENCE INSTITUTE, Daejeon (KR)

(72) Inventors: Seonghwan Choi, Daejeon (KR); Ji-Hye Baek, Daejeon (KR); Jihun Kim, Daejeon (KR); Jongyeob Park, Daejeon (KR); Heesu Yang, Daejeon (KR); Jeong-Yeol Han, Daejeon (KR)

(73) Assignee: KOREA ASTRONOMY AND SPACE SCIENCE INSTITUTE, Daejeon (KR)

( * ) Notice: Subject to any disclaimer, the term of this patent is extended or adjusted under 35 U.S.C. 154(b) by 138 days.

(21) Appl. No.: 18/251,723

(22) PCT Filed: Oct. 29, 2021

(86) PCT No.: PCT/KR2021/015376
§ 371 (c)(1),
(2) Date: May 4, 2023

(87) PCT Pub. No.: WO2022/097999
PCT Pub. Date: May 12, 2022

(65) Prior Publication Data
US 2024/0022828 A1    Jan. 18, 2024

(30) Foreign Application Priority Data
Nov. 4, 2020   (KR) .................. 10-2020-0145923

(51) Int. Cl.
*H04N 23/741*   (2023.01)
*G06T 5/73*   (2024.01)

(52) U.S. Cl.
CPC ............. *H04N 23/741* (2023.01); *G06T 5/73* (2024.01); *G06T 2207/20221* (2013.01)

(58) Field of Classification Search
CPC ......... H04N 23/741; H04N 23/60; G01J 9/00; G02B 27/106; G02B 26/06
See application file for complete search history.

(56) References Cited

U.S. PATENT DOCUMENTS

2004/0223214 A1* 11/2004 Atkinson ............. G02B 21/002
                                                              359/368
2013/0342811 A1* 12/2013 Warm ................ G01B 9/02091
                                                              356/479

(Continued)

FOREIGN PATENT DOCUMENTS

CN        105450933 A     6/2018
JP        2002-290822 A   10/2002

(Continued)

OTHER PUBLICATIONS

Extended European Search Report mailed Sep. 16, 2024 for corresponding Application No. 21889464.0 (8 pages).

(Continued)

*Primary Examiner* — Kelly L Jerabek
(74) *Attorney, Agent, or Firm* — Christopher R. Carroll; The Small Patent Law Group LLC

(57) ABSTRACT

The present invention relates to an adaptive optical system using artificial intelligence and not having a deformable mirror, the adaptive optical system being capable of generating an image with no distortion or minimized distortions, without using a surface-deformable reflector which is relatively expensive equipment, and also being capable of generating a high-quality image.

10 Claims, 5 Drawing Sheets

(56) References Cited

U.S. PATENT DOCUMENTS

2016/0209646 A1\* 7/2016 Hattori .................. G02B 21/002
2016/0349110 A1\* 12/2016 Markov .................... G01J 9/00
2016/0349529 A1\* 12/2016 Protz ....................... G01S 17/66

FOREIGN PATENT DOCUMENTS

| JP | 2014-154982 A | 8/2014 |
| JP | 2016-054423 A | 4/2016 |
| KR | 10-2006-0009308 A | 1/2006 |
| KR | 10-2015-0026268 A | 3/2015 |
| KR | 101726771 B1 | 4/2017 |

OTHER PUBLICATIONS

International Search Report and Written Opinion of the International Searching Authority for corresponding International Application No. PCT/KR2021/015376 (10 pages).

\* cited by examiner

ADAPTIVE OPTICAL SYSTEM USING ARTIFICIAL INTELLIGENCE AND NOT HAVING DEFORMABLE MIRROR

CROSS-REFERENCE TO RELATED APPLICATION

This application is a national phase entry of PCT/KR2021/015376 (filed 29 Oct. 2021), which claims priority to Korean patent application no. 10-2020-0145923 (filed 4 Nov. 2020), the entire disclosures of which are incorporated by reference.

BACKGROUND

Technical Field

The following disclosure relates to an optical system, and more particularly, to an optical system using artificial intelligence.

State of the Art

An optical system has been used in various fields including daily life. One of the examples of the optical system may include a reflector that reflects incident light to one side, a beam splitter that splits the light incident from the reflector, a camera that captures an image of one incident light among the lights split by the beam splitter, and a wave front sensor that detects a wave front of the other incident light among the lights split by the beam splitter. The optical system generates a relatively sharp image by varying an exposure time depending on a characteristic of a subject. For example, in a case of capturing an image of a celestial body with low dynamics by using the optical system, the exposure time is increased to collect weak incident light, thereby generating a sharp image. On the other hand, in a case of capturing an image of a subject with high dynamics, such as a vehicle, the exposure time is decreased to generate a sharp image. At this time, an atmosphere exists between the subject and the optical system, and an error is caused due to a change in atmosphere (a flow, a temperature change, or a refractive index of the atmosphere). In a case of a celestial body located relatively far away, the error due to the change in atmosphere becomes larger.

A method of measuring and correcting a distortion of a wave front of incident light in order to reduce such an optical distortion is called adaptive optics. The adaptive optics is a necessary technology for large telescopes with high performance/high resolution, and is essential equipment for obtaining a high-resolution observation image for astronomy and space science research. An adaptive optical system according to the related art uses a method of flattening a wave front of light incident to a camera by actively changing a surface of a reflector according to information regarding the wave front of the light detected by a wave front sensor. That is, in the optical system according to the related art, a surface of the reflector is controlled based on wave front information obtained from the wave front sensor, but such a method requires a relatively expensive deformable mirror to change the surface of the reflector.

Korean Patent Publication No. 10-1726771 ("Method and Apparatus for Flattening Deformable Mirror Using Strehl Ratio," published on Apr. 13, 2017)

BRIEF DESCRIPTION

The present invention has been devised to solve the above problems, and an object of an adaptive optical system using artificial intelligence and not having a deformable mirror according to the present invention is to provide an adaptive optical system using artificial intelligence that is capable of generating an image with no distortion or minimized distortions, without using a deformable mirror which is relatively expensive equipment.

In one general aspect, an adaptive optical system using artificial intelligence and not having a deformable mirror includes: a reflector reflecting incident light to one side: a beam splitter splitting light incident from the reflector into a first direction and a second direction: a camera positioned in the first direction with respect to the beam splitter and capturing an image of incident light split by the beam splitter for a first period to generate one first image at a first time point: at least one wave front sensor positioned in the second direction with respect to the beam splitter, detecting a wave front of incident light split by the beam splitter, and capturing an image of the incident light for a second period shorter than the first period to generate n second images including different light wave front information at the first time point; and a correction processor generating n corrected third images by using the first image and the light wave front information of the second images, and outputting an optimal image at the first time point by using the n third images.

The correction processor may determine whether dynamics of a subject in the image are high or low according to a predetermined criterion, in a case where the dynamics of the subject in the image are low, the correction processor may output, as the optimal image, an image having at least one of the highest sharpness or the highest contrast among the n third images.

The correction processor may compare rates of change of the n third images generated at the second time point after the first time point and the optimal images output at the first time point, select a third image having the smallest rate of change, and output the selected third image as an optimal image at the second time point.

The correction processor may determine whether dynamics of a subject in the image are high or low according to a predetermined criterion, in a case where the dynamics of the subject in the image are high, the correction processor may generate the optimal image by dividing each of the n third images into predetermined regions and combining regions having a higher sharpness or contrast among the divided regions, and output the optimal image.

The correction processor may divide each of the n third images into predetermined regions, and one region divided in the single third image may partially overlap with another adjacent region.

Before dividing each of the n third images into predetermined regions, the correction processor may align the n third images in such a way that a reference point is positioned at the same portions of the images, the reference point being a specific portion of the subject.

The correction processor may separate the subject and a background in each of the n third images, divide the subject into predetermined regions, and divide the background into predetermined regions.

The correction processor may generate the optimal image by merging images having a contrast equal to or higher than a reference value among the n third images and then output the optimal image.

Before merging the n third images, the correction processor may align the n third images in such a way that a reference point is positioned at the same portions of the images, the reference point being a specific portion of the subject.

The correction processor may generate the optimal image by dividing each of the n third images into predetermined regions and merging regions having a contrast equal to or higher than a reference value among the divided regions and output the optimal image.

In the adaptive optical system using artificial intelligence and not having a deformable mirror according to the present invention as described above, the correction processor corrects a distortion of an image by using a software method based on wave front information of light detected by the wave front sensor without using a reflection-surface-deformable reflector. Therefore, there is an effect that may implement a relatively cheap adaptive optical system capable of obtaining an image with no distortion.

In addition, according to the present invention, the correction processor may remove or minimize a distortion of an image by various methods in consideration of dynamics of a subject, and at the same time, may improve the quality of the image itself.

DETAILED DESCRIPTION

Figure 1:
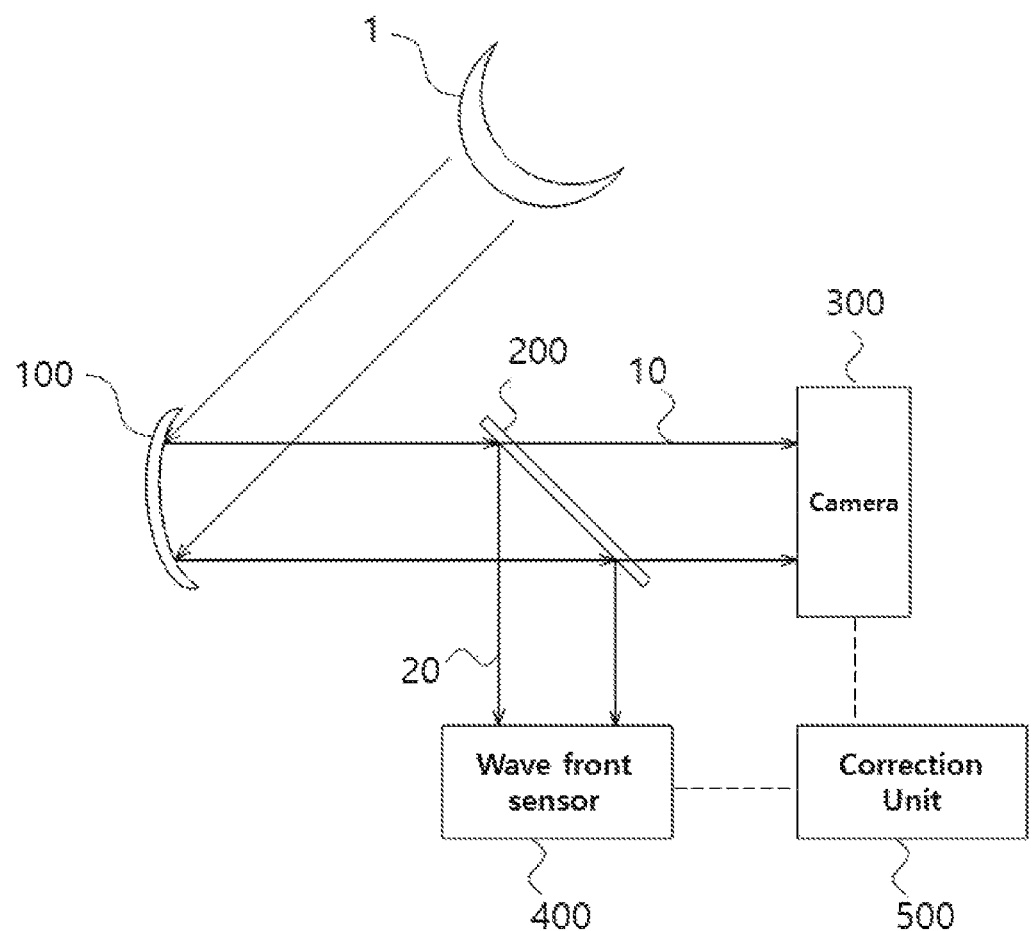
FIG. 1 is a schematic diagram of an adaptive optical system using artificial intelligence and not having a deformable mirror according to an exemplary embodiment of the present invention.

1: Subject
10: First split light
20: Second split light
31: First image
32-1, 32-2, . . . , 32-10: Second image
33-1, 33-2, . . . , 33-10: Third image
40: Optimal image
100: Reflector
200: Beam splitter
300: Camera
400: Wave front sensor
500: Correction processor Hereinafter, a preferred exemplary embodiment of an adaptive optical system using artificial intelligence and not having a deformable mirror according to the present invention will be described in detail with reference to the accompanying drawings.

The adaptive optical system using artificial intelligence and not having a deformable mirror according to various exemplary embodiments of the present invention basically aims to make an astronomical observation, but its use is not limited thereto, and may be used in various fields for capturing images. The fields in which the adaptive optical system using artificial intelligence and not having a deformable mirror according to various exemplary embodiments of the present invention is used may include the defense field, opticianry, and other fields in addition to the above-described astronomical observation.

FIG. 1 is a schematic diagram of an adaptive optical system using artificial intelligence and not having a deformable mirror according to an exemplary embodiment of the present invention.

As illustrated in FIG. 1, the adaptive optical system using artificial intelligence and not having a deformable mirror according to an exemplary embodiment of the present invention may include a reflector 100, a beam splitter 200, a camera 300, a wave front sensor 400, and a correction processor 500.

The reflector 100 illustrated in FIG. 1 reflects light incident from a subject 1 to the beam splitter 200 which is one side. The reflector 100 may be a general reflector having a fixed reflection surface, rather than a relatively expensive reflector whose reflection surface actively moves according to the related art. Since the reflector 100 itself determines a direction in which light is incident, the present invention may further include a movement processor that may move the reflector or change an angle of the reflector, and the reflector may automatically move or the angle of the reflector may be automatically changed in response to user's manipulation or under specific conditions. In particular, when the adaptive optical system using artificial intelligence and not having a deformable mirror according to various exemplary embodiments of the present invention is used to perform astronomical observation, the reflector may be programmed in advance to track a celestial body to be observed.

The beam splitter 200 splits light incident from the reflector 100 into a first direction and a second direction. Here, the first direction may be the same as a direction in which the light is incident on the beam splitter 200 from the reflector 100, and the second direction may be a direction perpendicular to the first direction. However, the present invention does not limit the first and second directions into which the beam splitter 200 split the light to the directions perpendicular to each other as illustrated in FIG. 1, and the first and second directions may vary depending on a specification or installation position of the beam splitter 200.

The lights split by the beam splitter 200 may have intensities different from that of the light before splitting. Here, the split light in the first direction and the split light in the second direction are referred to as first split light 10 and second split light 20. According to the present exemplary embodiment, the intensity of each of the first split light 10 and the second split light 20 may be 50% of that of the light before splitting, but the intensity of each of the first split light 10 and the second split light 20 according to the present invention is not limited thereto, and the beam splitter 200 may split the incident light in such a way as to have various intensities.

The camera 300 is positioned in the first direction with respect to the beam splitter 200, and the first split light 10 split by the beam splitter 200 is incident on the camera 300. The camera 300 generates a first image by capturing an image of the incident light with a first period.

The wave front sensor 400 is positioned in the second direction with respect to the beam splitter 200, and the second split light 20 split by the beam splitter 200 is incident on the wave front sensor 400. The wave front sensor 400 may include a plurality of microlenses mounted on a surface on which the second split light 20 is incident. The wave front sensor 400 captures an image of the incident light with a second period shorter than the first period, the first period being a period with which the camera 300 captures an image, and the wave front sensor 400 generates a second image including light wave front information of the second split light 20. The above-described first and second periods refer to exposure times described in the camera. The camera 300 may have a long exposure time, and the wave front sensor 400 may have a short exposure time. The first image may be a high-resolution image with a relatively severe distortion, and an object of the present invention is to output a clear image with no distortion by correcting the first image. As illustrated in FIG. 1, only one wave front sensor 400 is used in the present exemplary embodiment, but the number of wave front sensors 400 according to the present invention is not limited thereto, and a plurality of wave front sensors 400 may be used.

Figure 2:
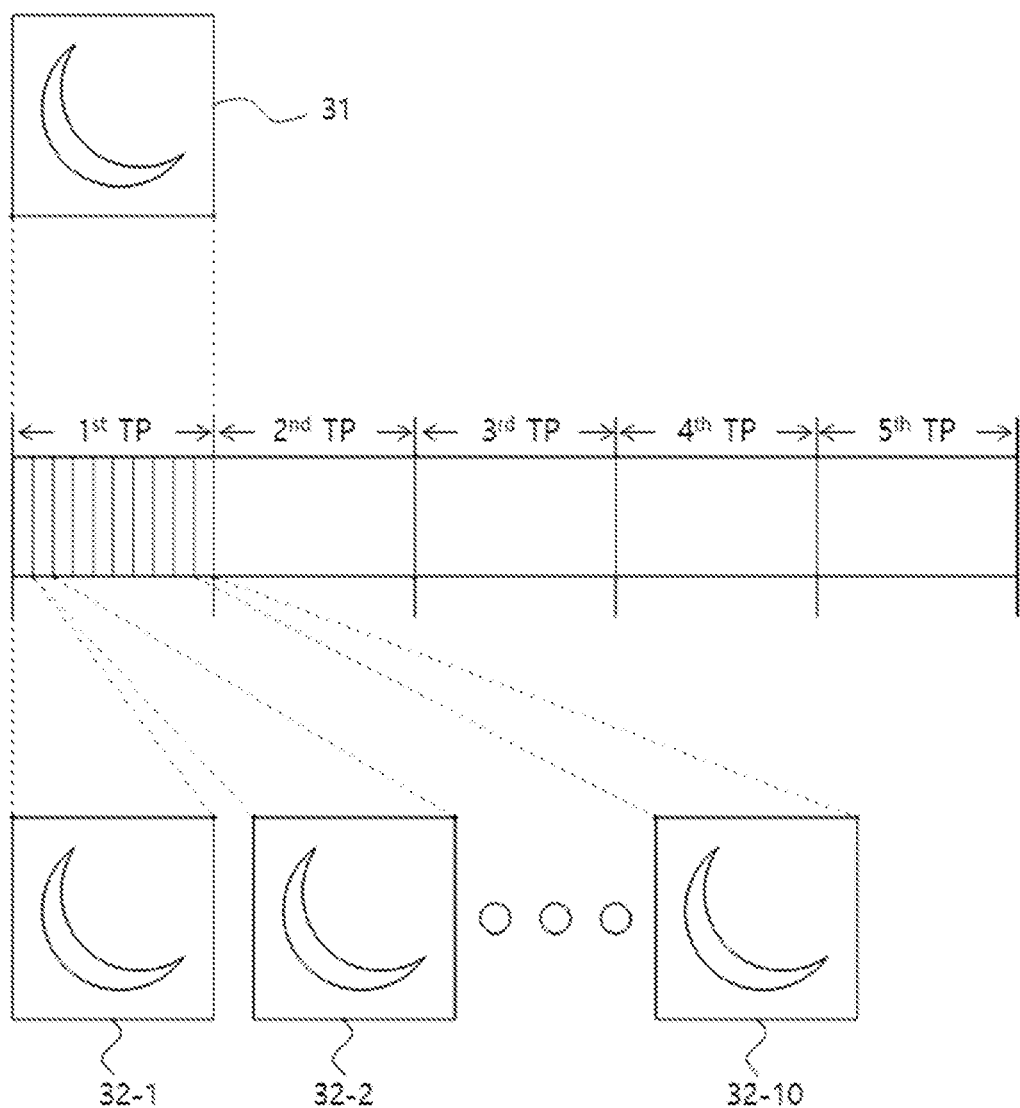
FIG. 2 is a conceptual diagram of a first image and a second image used in the adaptive optical system using artificial intelligence and not having a deformable mirror according to an exemplary embodiment of the present invention.

FIG. 2 is a schematic diagram for describing the first image and the second image described above.

The first period with which the camera 300 captures an image and the second period with which the wave front sensor 400 captures an image may be adjusted at various ratios. In the present exemplary embodiment, in a case where the first period is 10, the second period may be 1. More specifically, the first period may be 1 second, the second period may be 0.1 seconds, and as illustrated in FIG. 2, the camera 300 generates one first image 31 and the wave front sensor 400 generates ten second images 31-1, 31-2, . . . , and 31-10 at the same first time point (one second).

The correction processor 500 may generate ten corrected third images by using the ten second images and the one first image described above. The correction processor 500 may correct the first image by using the light wave front information included in the second images. Since the second images themselves are also images captured at different times, the second images include different light wave front information. Accordingly, the third images generated by the correction processor 500 may have different qualities, and in the present invention, the correction processor 500 may select and output an optimal image among the third images generated using several criteria, and a description thereof is provided below.

The first thing to consider when selecting one of the third images in the correction processor 500 may be the dynamics of the subject 1. More specifically, the correction processor 500 may select and output an optimal image among ten third images by distinguishing between a case where the dynamics of the subject 1 are higher than a reference value and a case where the dynamics of the subject 1 are lower than the reference value. At this time, the user may manually set whether the dynamics are high or low prior to observation according to the type of the subject 1 before using the adaptive optical system using artificial intelligence and not having a deformable mirror according to the present invention, and in a case where the user does not separately set whether the dynamics are high or low, whether the dynamics are high or low may be determined by comparing a rate of change of the third image (comparing a pixel change from the previous image) over time with the reference value. The reference value for determining the dynamics of the subject may also be set in advance by the user or automatically set in the correction processor 500 to be described below. In addition, according to the present invention, the correction processor 500 may determine the dynamics of the subject according to a predetermined criterion, a data set may be obtained by evaluating, by the user, a result of determining the dynamics of the subject by the correction processor 500, the correction processor 500 may be continuously trained by machine learning using the data set described above to make more accurate determination, and the correction processor 500 may derive the reference value for determining the dynamics of the subject in such a machine learning process.

In a case where the dynamics of the subject are low, the correction processor 500 may select and output an image having at least one of the highest sharpness or the highest contrast among the ten third images. Hereinafter, the image selected and output by the correction processor 500 among the third images is referred to as an optimal image, and the optimal image may be an image with minimized distortions or no distortion. In the process in which the correction processor 500 selects the optimal image, there may be one third image with the highest sharpness and contrast among the ten third images, but in some cases, one third image may have a higher sharpness and a lower contrast than another third image according to circumstances. In this case, an image may be selected by first setting one of the sharpness and the contrast as a determination criterion, or one image may be selected by digitizing the sharpness and the contrast according to a predetermined criterion and comparing the sum of the sharpness and the contrast for each image.

The correction processor 500 may select and output an optimal image by checking the sharpness and the contrast of all the third images for all time points. However, in the above-described method, it is necessary to select an optimal image by measuring the sharpness and contrast of all the images for all the time points (for example, every one second), and thus, a computation amount of the correction processor 500 itself may be increased. In order to solve such a problem, in the present exemplary embodiment, at a first time point, an image having the highest sharpness and contrast may be selected and output among the ten third images, and then, at a second time point, ten third images at the second time point may be compared with the third image selected at the first time point, and an image having the smallest rate of change at the second time point may be selected and output. Here, the rate of change may mean a rate of change of pixels, and such an operation of the correction processor 500 may be continuously performed as time passes to thereby derive a plurality of optimal images even after the first time point and also generate a video by using the plurality of optimal images.

The method of selecting and outputting an optimal image in the above-described manner may be difficult to use in a case where the dynamics of the subject 1 are high. In particular, in a case where the dynamics of the subject 1 are high, one third image may not have a uniform quality, for example, the sharpness or contrast of the third image may be high in a specific region and may be low in other regions. Therefore, the optimal image needs to be derived in a different way.

Figure 3:
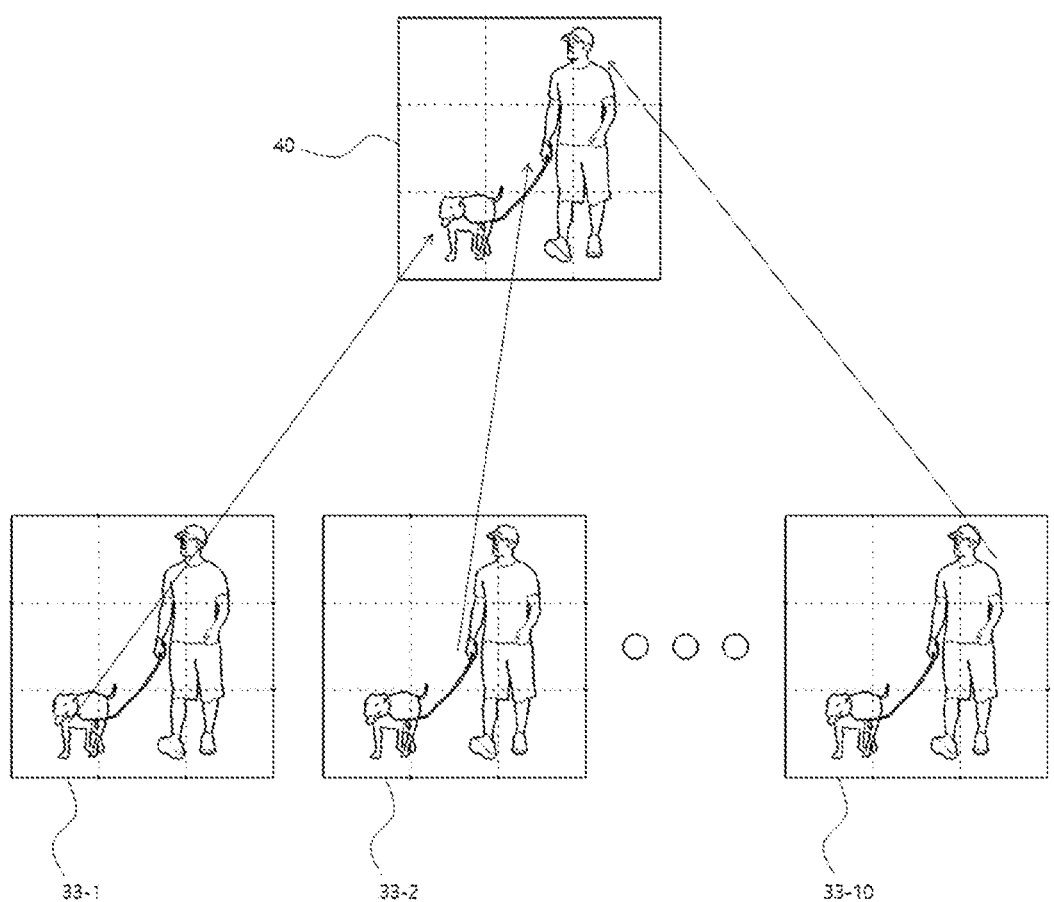
FIG. 3 is a schematic diagram illustrating an example in which a correction processor of the adaptive optical system using artificial intelligence and not having a deformable mirror according to an exemplary embodiment of the present invention derives an optimal image in a case where dynamics of a subject are high.

FIG. 3 illustrates a schematic example in which the correction processor 500 derives an optimal image in a case where the dynamics of the subject are high. In order to describe the case where the dynamics of the subject are high, FIG. 3 illustrates a case where the subject is a person walking with a dog, not a celestial body.

As illustrated in FIG. 3, the correction processor 500 divides each of a total of ten third images 33-1, 33-2, . . . , and 33-10 into predetermined regions. In the present exemplary embodiment, each of the ten third images 33-1, 33-2, . . . , and 33-10 is divided into nine regions, and among the divided regions, a region having a high sharpness or contrast is selected. Then, all the selected regions are collected to generate one optimal image 40. In this way, the optimal image 40 is generated by selecting a region having the highest sharpness or contrast among the same regions. Therefore, among the ten third images 3-1, 33-2, . . . 33-10, there may be a third image of which no region is used, and there may be a third image of which not one but two or more regions are used.

In such a method, it is necessary to correct the third images 33 to be captured images of the same position, before dividing each of the ten third images 33 into predetermined regions. That is, center points of all the third images 33 need to be aligned.

Figure 4:
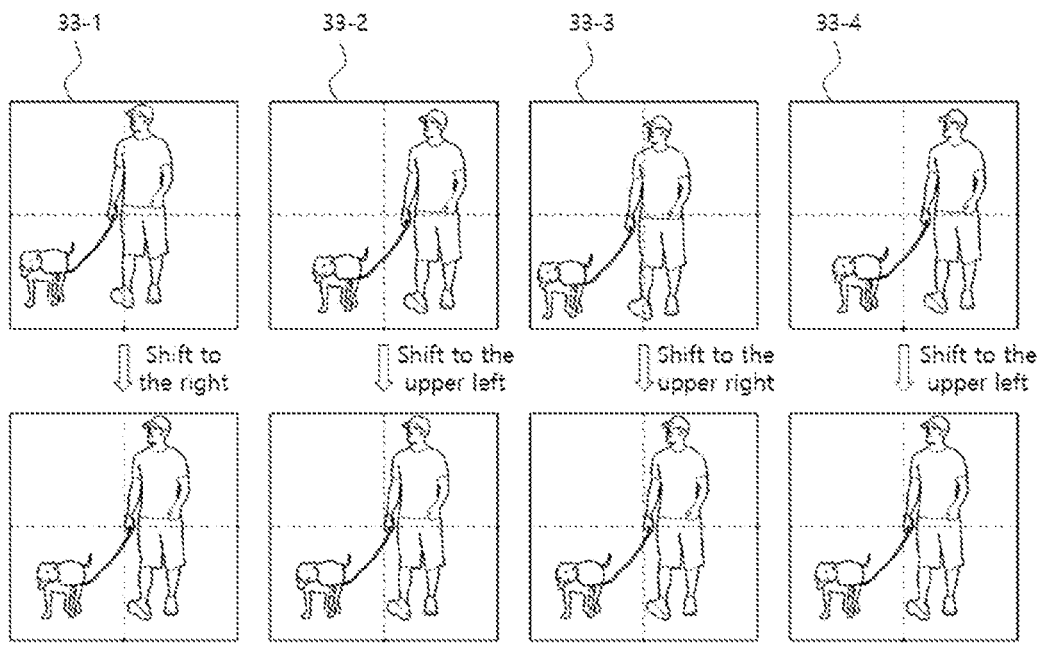
FIG. 4 is a schematic diagram illustrating a process of aligning a third image by the correction processor of the adaptive optical system using artificial intelligence and not having a deformable mirror according to an exemplary embodiment of the present invention.

As illustrated in FIG. 4, the center points of the third images 33 may be aligned by setting a specific portion of the subject 1 as a reference point, and horizontally and vertically moving the third images 33-1, 33-2, 33-3, and 33-4 in such a way that the reference point is positioned at the center of the third image. Here, the reference point may be a feature portion of the subject 1, and in a case of the four third images 33-1, 33-2, 33-3, and 33-4 corrected after capturing an image of a person and a dog on a walk illustrated in FIG. 4, the third images 33-1, 33-2, 33-3, and 33-4 may be horizontally or vertically moved based on a hand of the person. At this time, the correction processor 500 may select, as the reference point, a featuring portion according to an arbitrary or predetermined criterion. For example, the correction processor 500 may select, as the reference point, a portion with a higher sharpness among portions positioned within a certain range from the central point, and shift the third images 33-1, 33-2, 33-3, and 33-4 toward the central portion, thereby aligning the respective images.

Figure 5:
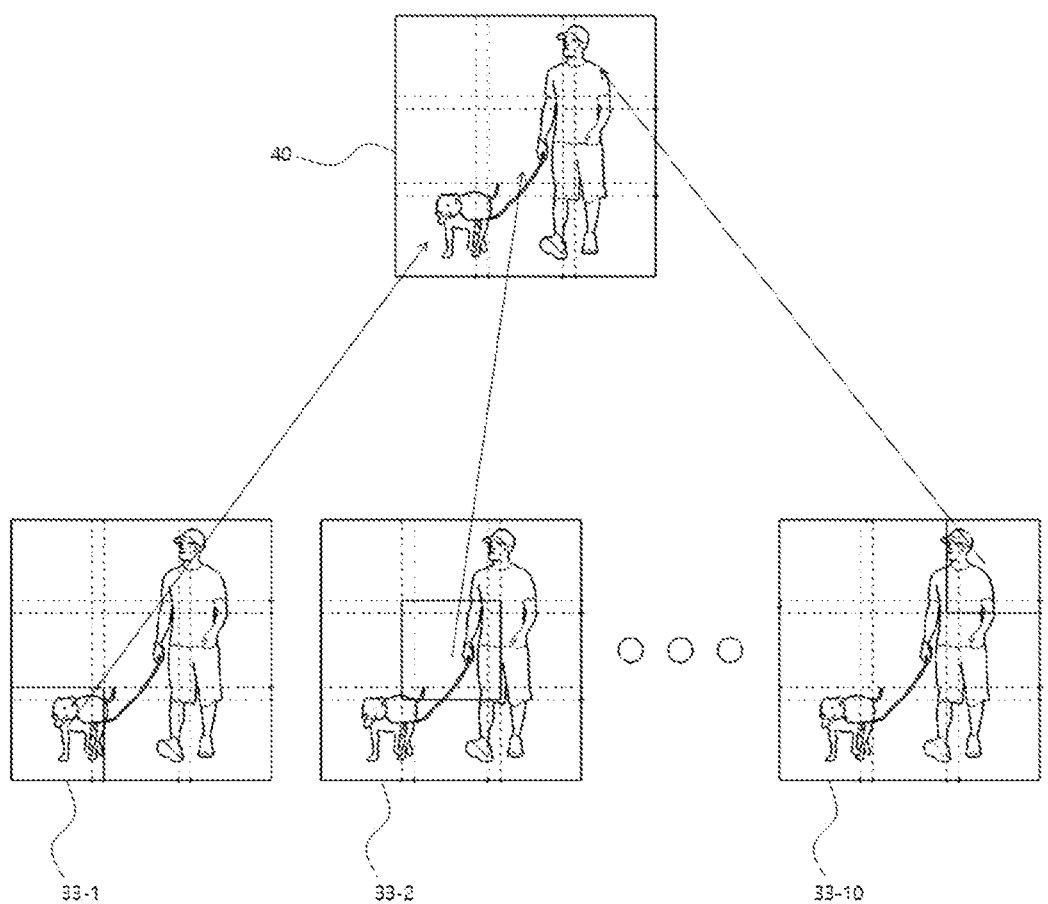
FIG. 5 is a schematic diagram illustrating another example in which the adaptive optical system using artificial intelligence and not having a deformable mirror according to an exemplary embodiment of the present invention derives an optimal image in a case where dynamics of a subject are high.

In the above-described method in which the third image is divided into regions and one optimal image is generated, division lines of adjacent divided regions of the third image abut each other. However, in such a method, a certain degree of error may occur even in a case where the center points of all the third images are aligned, and therefore, even in a case where an optimal image is generated by collecting all selected regions, a certain degree of image loss may occur. In order to prevent such a problem, as illustrated in FIG. 5, according to the present exemplary embodiment, the correction processor 500 does not divide the third image into a plurality of regions in such a way as to fit exactly as illustrated in FIG. 3, but may instead divide the third image into a plurality of regions in such a way that adjacent divided regions overlap each other to a certain extent, and the correction processor 500 may generate an optical image by performing correction in such a way that the selected regions overlap each other.

Although the third image is divided into regions in a lattice form in the method described above with reference to FIGS. 3 and 5, the present invention is not limited thereto, and the third image may also be divided into regions in a circular form or a polygonal form depending on a shape or feature of the subject. In addition, the correction processor 500 may separate the subject and a background included in the third image, divide the subject and the background into predetermined regions, and select only portions having a higher sharpness or contrast among the divided regions to form one optimal image. In a case where the correction processor 500 separates the subject and the background, edge detection in which an edge is thickened by increasing the sharpness of a specific object and a background in order to separate the object and the background in a general image processing technique may be used. The edge detection may be implemented by differentiating an image or using an edge or corner detection filter/mask. Further, a method in which features of the subject included in the third image are extracted and the third image is divided into predetermined regions based on position information of each feature may also be used. This method may also be implemented by an image processing technique in which the correction processor 500 uses a filter or mask for detecting edges in the third image.

In addition to the above-described method in which an optimal image is generated by dividing the third image into predetermined regions and merging the respective regions, there may also be a method in which an optimal image is generated by merging images having a higher contrast among the third images. In this case, a method in which, among the total of ten third images, except for a third image having a lower contrast, the remaining third images are merged, may be used. When generating an optimal image by merging the third images, the third images may be aligned using the reference point described with reference to FIG. 4 and then merged to generate the optimal image. In addition, although an optimal image may be generated by merging all the third images, there may also be an example in which the third image is divided into predetermined regions and an optimal image is generated by separately merging regions having a higher contrast.

The adaptive optical system using artificial intelligence and not having a deformable mirror as described above may be used not only for astronomical observation but also for various fields in daily life. In the present specification, a celestial body has been described as an example of a subject with low dynamics. In a case of some celestial bodies such as the sun, some parts may have high dynamics (in a case where an explosion occurs on the surface of the sun), and other parts may have low dynamics. Accordingly, the correction processor 500 according to the present invention may generate and output an optimal image by mixing the above-described methods for some subjects in a case where only a part of the subject has high dynamics and the remaining parts have low dynamics. Taking the sun as an example, the correction processor 500 divides the third images into a central portion of the sun, a surface portion of the sun, and other portions. In a case of the central portion of the sun and other portion having low dynamics, a portion having the highest sharpness and contrast is selected, and in a case of the surface portion of the sun having high dynamics, one partial image is generated by overlapping divided portions or by dividing the surface portion of the sun into predetermined regions and combining the regions. Therefore, in a case where the dynamics are low, a method in which an optimal image is derived by combining with a selected portion may also be used.

The correction processor 500 described above may be a kind of artificial intelligence model, and may be trained using a predetermined data set.

The correction processor 500 may be an artificial intelligence model, may be trained by using, as input values, an image data set of an image before correction observed in an existing general adaptive optical system and an image after correction and light wave front information (wave front information, Shack-Hartmann wave front sensor, or Zernike polynomial coefficients) obtained through the wave front sensor 400, and may be used to correct a distorted image. The image data set for model training is required for both a laboratory environment and a real observation environment. The present invention may be used to improve the performance of the correction processor 500 by inputting images before and after correction to the correction processor 500 in real time during observation. Therefore, according to the present invention, a complicated process such as calculation of the degree of distortion of the light wave front or manipulation of the deformable mirror is not necessary. As a result, it is possible to configure a simple system with a higher speed than the existing system.

The present invention is not limited to the abovementioned exemplary embodiments, but may be variously applied, and may be variously modified without departing from the gist of the present invention claimed in the claims.

The invention claimed is:

1. An adaptive optical system using artificial intelligence and not having a deformable mirror, the adaptive optical system comprising:
    a reflector reflecting incident light to one side;
    a beam splitter splitting the incident light from the reflector into a first direction and a second direction;
    a camera positioned in the first direction with respect to the beam splitter and capturing an image of the incident light split by the beam splitter for a first period to generate one first image at a first time point;
    at least one wave front sensor positioned in the second direction with respect to the beam splitter, detecting a wave front of the incident light split by the beam splitter, and capturing an image of the incident light for a second period shorter than the first period to generate n second images including different light wave front information at the first time point; and
    a correction processor generating n corrected third images by using the first image and the light wave front information of the second images, the correction processor outputting an optimal image at the first time point by using the n corrected third images,
    wherein the correction processor determines whether dynamics of a subject in the n corrected third images are high or low according to a predetermined criterion, and
    the correction processor outputs an optimal image based on the dynamics that are determined.

2. The adaptive optical system of claim 1, wherein
    in a case where the dynamics of the subject in the n corrected third images are low, the correction processor outputs, as the optimal image, one of the n corrected third images having at least one of a highest sharpness or a highest contrast among the n corrected third images.

3. The adaptive optical system of claim 2, wherein the correction processor compares rates of change of the n corrected third images generated at a second time point after the first time point and the optimal image output at the first time point, selects a fourth image having a smallest rate of change, and outputs the fourth image as an optimal image at the second time point.

4. The adaptive optical system of claim 1, wherein
    in a case where the dynamics of the subject in the image are high, the correction processor generates the optimal image by dividing each of the n corrected third images into predetermined regions and combining regions having a higher sharpness or contrast among the predetermined regions, and outputs the optimal image.

5. The adaptive optical system of claim 4, wherein the correction processor divides each of the n corrected third images into the predetermined regions,
    with a first region of the predetermined regions divided in a single one of the n corrected third images partially overlapping another adjacent region in the predetermined regions.

6. The adaptive optical system of claim 4, wherein before dividing each of the n corrected third images into the predetermined regions, the correction processor aligns the n corrected third images in such a way that a reference point is positioned at same portions of the n corrected third images, the reference point being a specific portion of the subject.

7. The adaptive optical system of claim 4, wherein the correction processor separates the subject and a background in each of the n corrected third images, divides the subject into predetermined regions, and divides the background into the predetermined regions.

8. The adaptive optical system of claim 1, wherein the correction processor generates the optimal image by merging the n corrected third images having a contrast equal to or higher than a reference value among the n corrected third images and then outputs the optimal image.

9. The adaptive optical system of claim 8, wherein before merging the n corrected third images, the correction processor aligns the n corrected third images in such a way that a reference point is positioned at same portions of the n corrected third images, the reference point being a specific portion of the subject.

10. The adaptive optical system of claim 8, wherein the correction processor generates the optimal image by dividing each of the n corrected third images into predetermined regions and merging the predetermined regions having a contrast equal to or higher than a reference value among the predetermined regions and outputs the optimal image.

* * * * *